(12) United States Patent
Chung

(10) Patent No.: US 8,960,614 B2
(45) Date of Patent: Feb. 24, 2015

(54) FOLDABLE SUPPORT ASSEMBLY

(76) Inventor: Kiosky Chung, Taichung (TW)

( * ) Notice: Subject to any disclaimer, the term of this patent is extended or adjusted under 35 U.S.C. 154(b) by 397 days.

(21) Appl. No.: 13/287,090

(22) Filed: Nov. 1, 2011

(65) Prior Publication Data
US 2013/0105645 A1 May 2, 2013

(51) Int. Cl.
*F16M 11/00* (2006.01)
*A47J 37/06* (2006.01)

(52) U.S. Cl.
CPC .................................. *A47J 37/0664* (2013.01)
USPC ........ 248/125.8; 248/121; 248/126; 248/130; 248/220.21; 126/25 R

(58) Field of Classification Search
USPC ........ 248/121, 125.9, 125.7, 125.3, 126, 127, 248/130, 131, 136, 138, 146.6, 150, 153, 248/220.21, 227.4, 125.8; 126/25 R, 9 R, 126/9 B, 30, 40, 50
See application file for complete search history.

(56) References Cited

U.S. PATENT DOCUMENTS

| | | | | |
|---|---|---|---|---|
| 1,300,861 A | * | 4/1919 | Otte | 108/131 |
| 1,953,527 A | * | 4/1934 | Bentley | 248/456 |
| D116,438 S | * | 8/1939 | Wright | D8/395 |
| 3,312,444 A | * | 4/1967 | De Sena | 248/231.81 |
| 3,556,076 A | * | 1/1971 | Stewart | 126/9 R |
| 3,614,042 A | * | 10/1971 | Jensen | 248/97 |
| 4,920,950 A | * | 5/1990 | Johnson | 126/29 |
| 5,947,007 A | * | 9/1999 | O'Grady et al. | 99/340 |
| 6,182,560 B1 | * | 2/2001 | Andress | 99/400 |
| 6,439,111 B1 | * | 8/2002 | Lu | 99/449 |
| 6,539,843 B2 | * | 4/2003 | Andress | 99/385 |
| 6,865,985 B2 | * | 3/2005 | Zheng | 100/127 |
| 6,955,327 B1 | * | 10/2005 | Skvorecz | 248/153 |
| 7,913,682 B2 | * | 3/2011 | Chung | 126/25 R |
| 8,439,316 B2 | * | 5/2013 | Feige | 248/71 |
| 2002/0148458 A1 | * | 10/2002 | Andress | 126/25 R |
| 2006/0144383 A1 | * | 7/2006 | Mizrahi et al. | 126/9 R |
| 2010/0024798 A1 | * | 2/2010 | Sampson | 126/25 R |
| 2012/0070556 A1 | * | 3/2012 | Wilson et al. | 426/523 |
| 2012/0174907 A1 | * | 7/2012 | Yeh | 126/25 R |
| 2013/0118472 A1 | * | 5/2013 | Ducate et al. | 126/25 R |

* cited by examiner

Primary Examiner — Monica Millner

(57) ABSTRACT

A foldable support assembly includes two seats respectively secured on an underside of a roaster and corresponding to each other. A U-shaped support element includes two ends respectively pivotally connected to a corresponding one of the two seats. The U-shaped support element is selectively positioned when supporting the roaster.

3 Claims, 7 Drawing Sheets

US 8,960,614 B2

FOLDABLE SUPPORT ASSEMBLY

BACKGROUND OF THE INVENTION

1. Field of the Invention

The present invention relates to a support assembly, and more particularly to a roaster support assembly that can be easily folded and positioned.

2. Description of Related Art

A roaster, for example, usually has multiple legs securely mounted onto a bottom of the roaster to make the roaster has a height for an easy operation during roasting food. Consequently, the conventional roaster will occupy a great room when being stored such that some roster manufactures provide a pivot structure between the roaster and the legs for folding the legs. However, the roaster may be toppled down and the burning charcoal may hurt the operator when the leg is kicked and folded. It is very dangerous.

The present invention has arisen to mitigate and/or obviate the disadvantages of the conventional legs that are provided to support a roaster.

SUMMARY OF THE INVENTION

The main objective of the present invention is to provide an improved support assembly that can be easily folded and positioned.

To achieve the objective, the foldable support assembly comprises two seats respectively secured on a bottom of an object, such as a roaster and a U-shaped support element having two ends respectively pivotally connected to a corresponding one of the two seats. At least one seat includes a horizontal board adapted to be secured on an underside of a roaster. A vertical board extends from one side of the horizontal board, wherein the vertical board has a through hole defined therein and a curved corner formed thereon. A support board vertically extends along an edge of the curved corner and a side board vertically extends from the vertical board, wherein the side board vertically corresponds to the board. The support board includes two ends respectively formed with a slant portion and a vertical portion, wherein the slant portion and the vertical portion respectively correspond to the board and the side board, and the vertical portion is separated from the side board. The support board has a concave portion defined between the slant portion and the vertical portion to form a first convex portion relative to the slant portion and a second convex portion relative to the vertical portion. The support element includes a first axle and a second axle respectively extending from two opposite ends thereof, wherein the first axle and the second axle respectively have a length greater than a height of the vertical portion. The first axle and the second axle respectively extend through the through hole in the vertical board of a corresponding one of the seat for pivotally the support element to the two seats.

Further benefits and advantages of the present invention will become apparent after a careful reading of the detailed description with appropriate reference to the accompanying drawings.

DETAILED DESCRIPTION OF THE INVENTION

Figure 1:
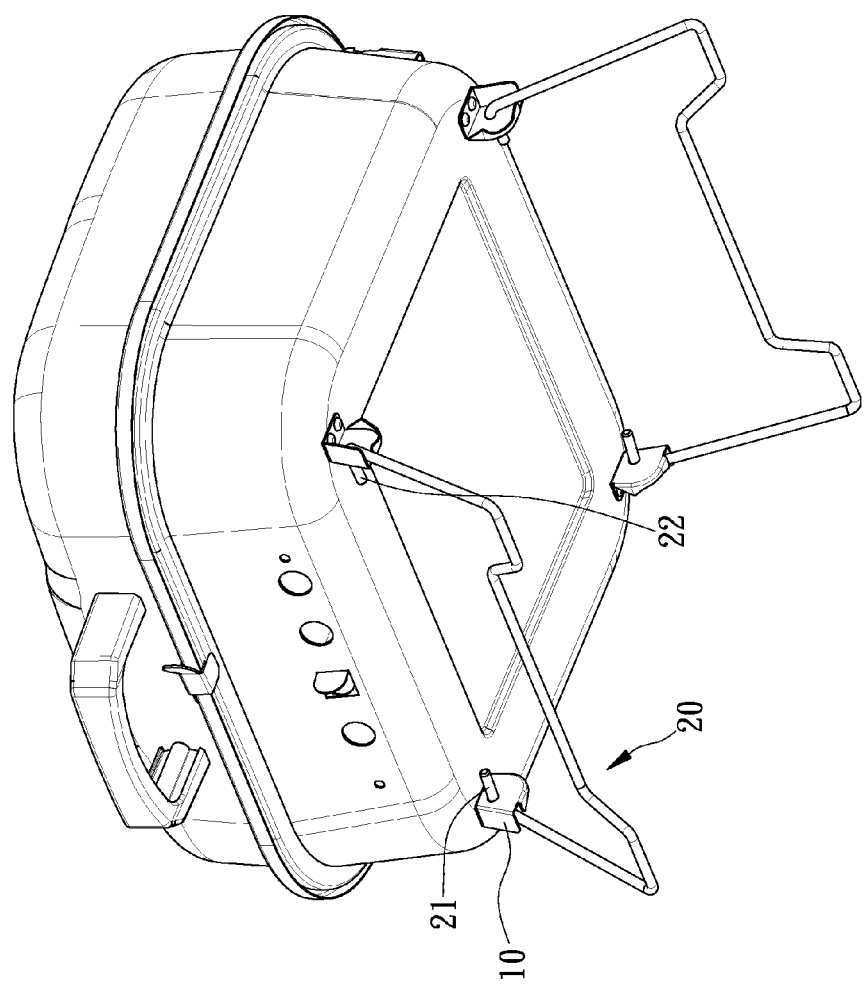
FIG. 1 is a perspective schematic view of a foldable support assembly in accordance with the present invention, which is provided to support a roaster.
Figure 2:
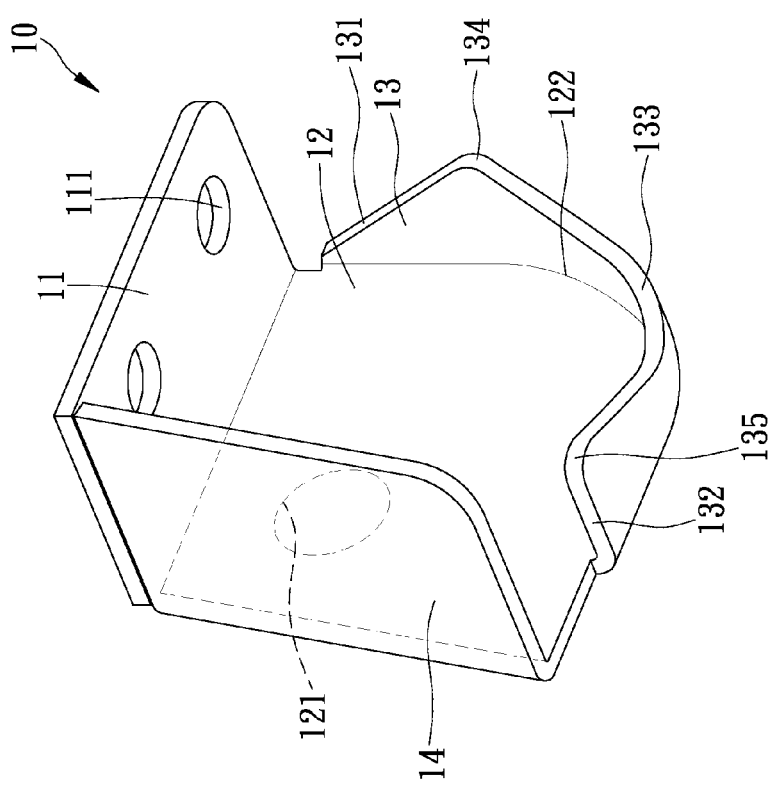
FIG. 2 is a perspective view of a seat of the foldable support assembly in accordance with the present invention.

Referring to the drawings and initially to FIGS. 1 and 2, a foldable support assembly in accordance with the present invention comprises two seats (10) respectively secured on a bottom of an object, such as a roaster and a U-shaped support element (20) having two ends respectively pivotally connected to a corresponding one of the two seats (10).

At least one seat (10) includes a horizontal board (11) adapted to be secured on an underside of a roaster. The board (11) has at least one through hole (111) defined therein to allow bolt (not numbered) extending through the board (11) and securing the seat (10) onto the underside of the roaster. A vertical board (12) extends from one side of the horizontal board (11), wherein the vertical board (12) has a through hole (121) defined therein and a curved corner (122) formed thereon. A support board (13) vertically extends along an edge of the curved corner (122) and a side board (14) vertically extends from the vertical board (12). The support board (13) includes two ends respectively formed with a slant portion (131) and a vertical portion (132), wherein the slant portion (131) and the vertical portion (132) respectively correspond to the board (11) and the side board (14), and the vertical portion (132) is separated from the side board (14). The support board (13) has a concave portion (133) defined between the slant portion (131) and the vertical portion (132) to form a first convex portion (134) relative to the slant portion (131) and a second convex portion (135) relative to the vertical portion (132).

The support element (20) includes a first axle (21) and a second axle (22) respectively extending two opposite ends thereof, wherein the first axle (21) and the second axle (22) respectively have a length greater than a height of the vertical portion (132). The first axle (21) and the second axle (22) respectively extend through a corresponding one of the two seats (10) for pivotally the support element (20) to the two seats (10).

Figure 3:
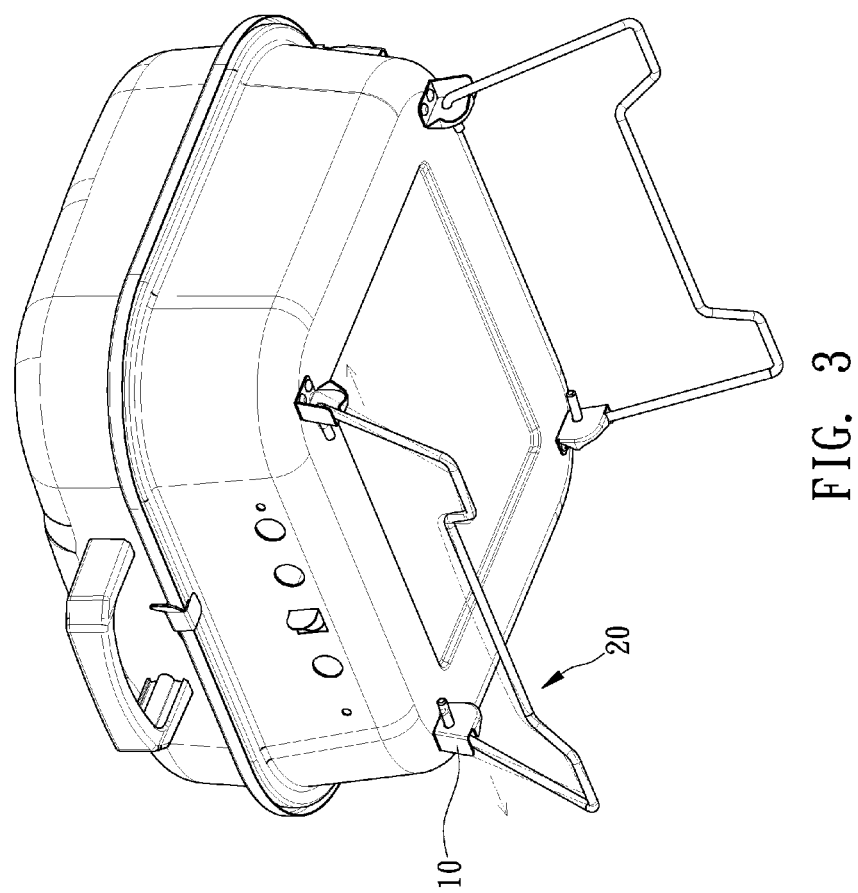
FIG. 3 is an operational view of the foldable support assembly in accordance with the present invention.
Figure 4:
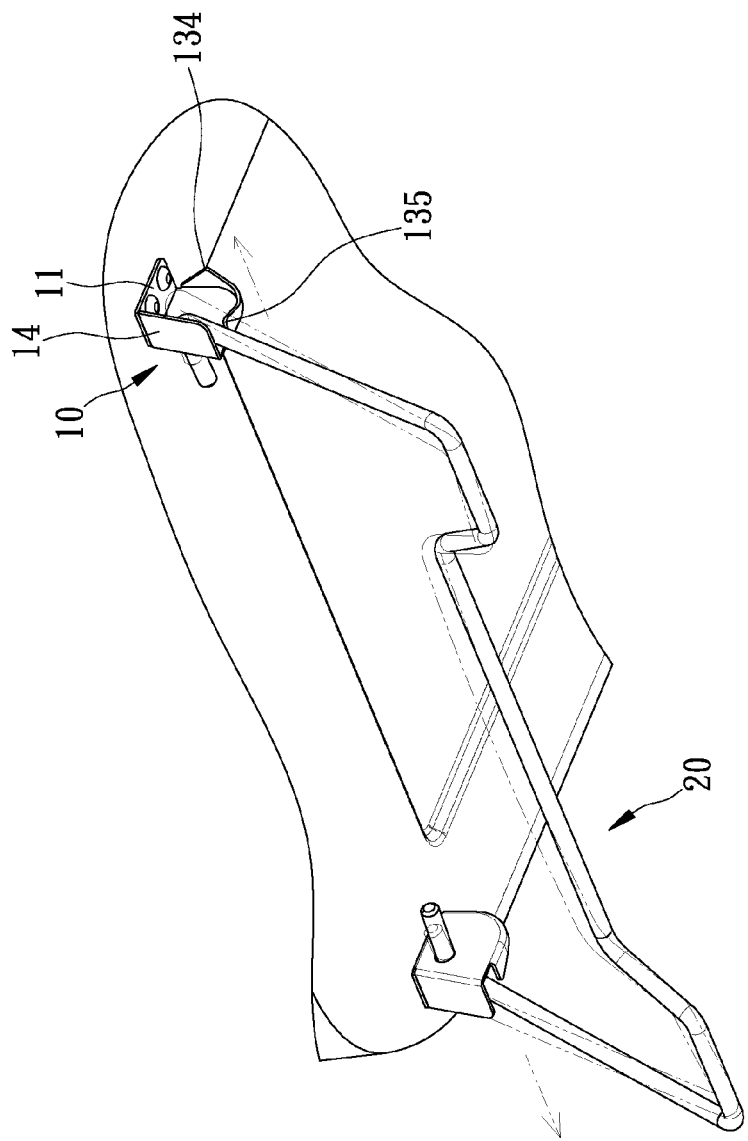
FIG. 4 is a partial enlarged view of the foldable support assembly in FIG. 3.
Figure 5:
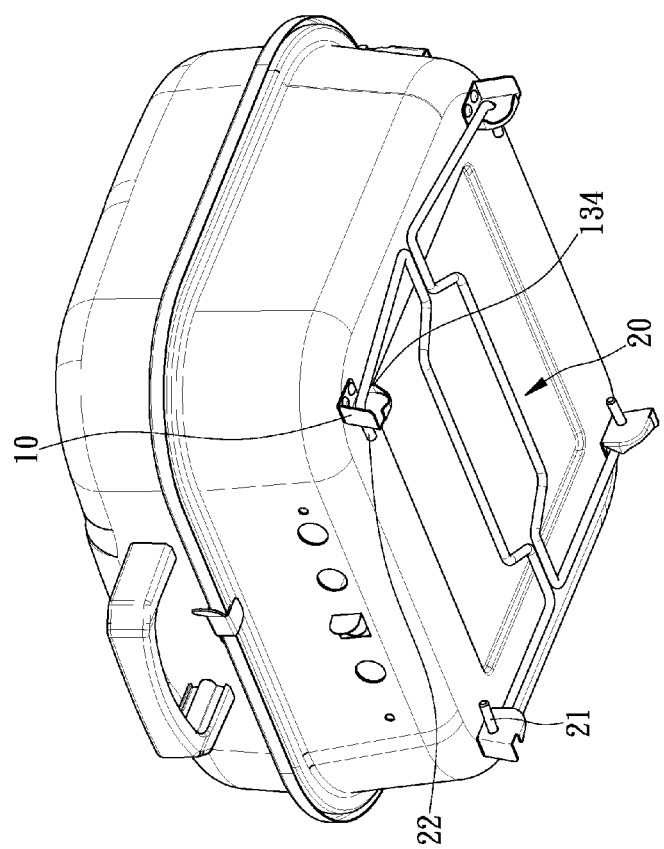
FIG. 5 is a perspective schematic view of a foldable support assembly in accordance with the present invention when being folded.

With reference to FIGS. 3 to 5, the support element (20) is positioned between the vertical portion (132) and the side board (14) when supporting the roaster such that support element (20) does not be suddenly folded and the safety of the roaster is ensured. When folding the support assembly in accordance with the present invention, the two opposite sides of the support element (20) are outwardly pulled at the same time to make the support element (20) moved over the second convex portion (135) of each of the two seats (10). The support element (20) automatically slides toward the first convex portion (134) due to a restitution first thereof. Finally, the support element (20) is pushed toward the bottom of the roaster, and the support element (20) abuts against the bottom of the roaster and engaged between the slant portion (131) and the horizontal board (11) after being moved over the first convex portion (134), as shown in FIG. 5. When using the support element (20) to support the roaster, the operator can directly downward pulled the support element (20) due to the slant portion (131). The support element (20) can stably support the roaster after being moved over the second convex portion (135) and positioned between the vertical portion (132) and the side board (14).

Figure 6:
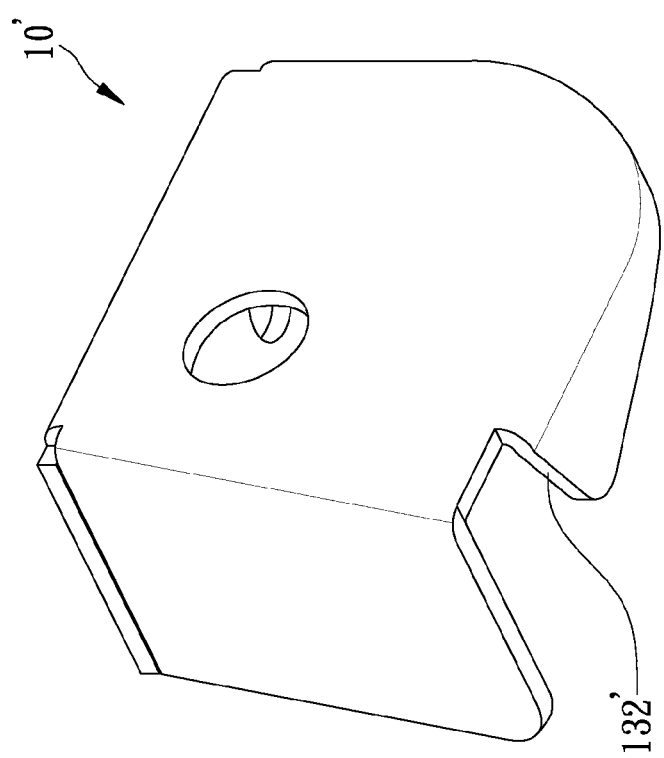
FIG. 6 is a perspective view of a second embodiment of the seat of the foldable support assembly in accordance with the present invention.
Figure 7:
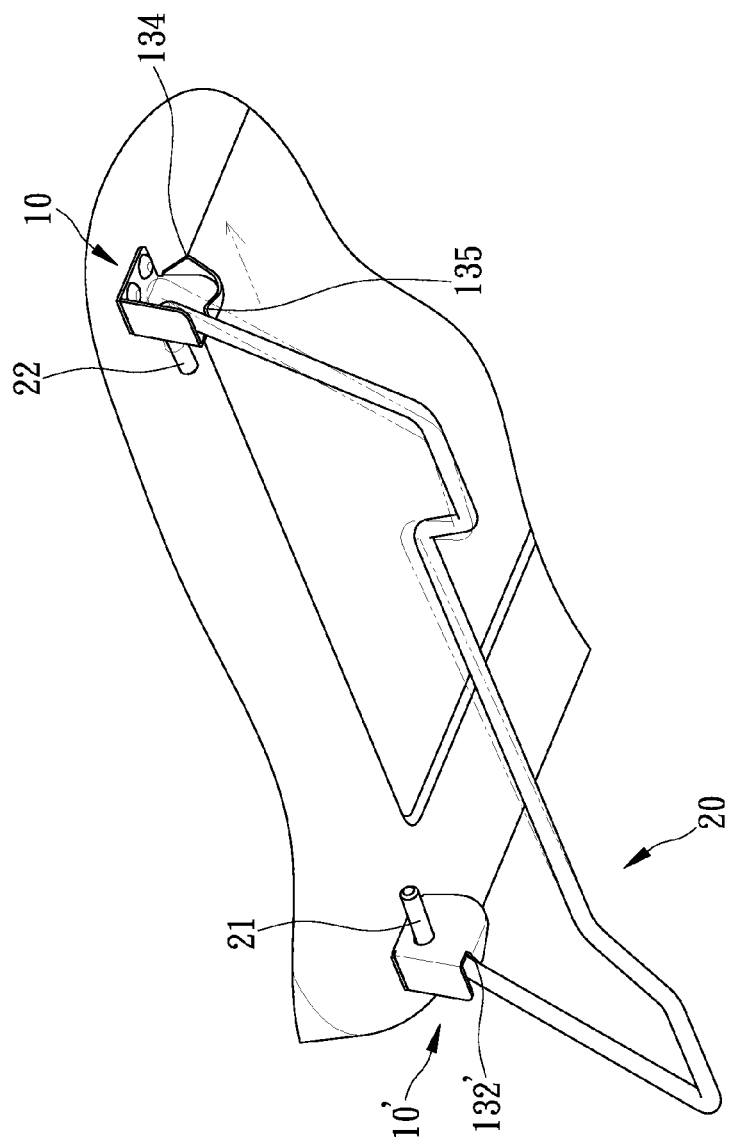
FIG. 7 is an operational view of the second embodiment of the foldable support assembly in accordance with the present invention.

With reference to FIG. 6 that shows a second embodiment of the seat (10') in accordance with the present invention, in this embodiment, the vertical portion (132) is displaced by an inclined portion (132'). However, only one seat (10) in the above embodiment can be displaced by the seat (10'), as shown in FIG. 6. With reference to FIG. 7, when folding the support element (20), the operator only needs to pull one side of the support element (20), which corresponds to the seat (10) that has vertical portion (132). Consequently, the operational method of the foldable support assembly in accordance with the present invention is simplified.

Although the invention has been explained in relation to its preferred embodiment, it is to be understood that many other possible modifications and variations can be made without departing from the spirit and scope of the invention as hereinafter claimed.

What is claimed is:

1. A foldable support assembly comprising:

first and second seats adapted to be secured on an underside of an object, wherein the first seat includes a horizontal board adapted to be secured on an underside of the object, a vertical board extending from a side of the horizontal board, a support board extending perpendicular to the vertical board, and a side board extending perpendicular to the vertical board, wherein the vertical board is formed with a through hole and a curved corner, wherein the support board extends along the curved corner and is formed with an edge that includes, relative to the vertical board, an inclined portion near the horizontal board, a perpendicular portion extending near the side board and parallel to the side board, a first convex portion near the inclined portion, a second convex portion near the perpendicular portion, and a concave portion between the first and second convex portions; and a U-shaped support element including first and second ends pivotally connected to the first and second seats and an axle extending perpendicular to the first end and including a length greater than a height of the perpendicular portion measured from the vertical board, wherein the axle is movably inserted in the through hole of the vertical board of the first seat to pivotally connect the first end of the U-shaped support element to the first seat, wherein the first end of the U-shaped support element remains engaged within a gap between the side board and the perpendicular portion of the edge of the support board until disengaged from the gap when the first end of the U-shaped support element is moved in a direction away from the vertical board to cause the first end to move over the second convex portion.

2. The foldable support assembly as claimed in claim 1, wherein the horizontal board has at least one through hole through which a bolt extends through the horizontal board to secure the first seat onto the underside of the roaster.

3. The foldable support assembly as claimed in claim 1, wherein the board of each of the first seat and the second seat has at least one through hole defined therein to allow bolt extending through the board and securing the seat onto the underside of the roaster.

* * * * *